United States Patent
Honkura

(10) Patent No.: US 10,700,389 B2
(45) Date of Patent: Jun. 30, 2020

(54) BATTERY CONTROL DEVICE

(71) Applicant: HITACHI, LTD., Tokyo (JP)

(72) Inventor: Kohei Honkura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/748,065

(22) PCT Filed: Jun. 22, 2016

(86) PCT No.: PCT/JP2016/068451
§ 371 (c)(1),
(2) Date: Jan. 26, 2018

(87) PCT Pub. No.: WO2017/022354
PCT Pub. Date: Feb. 9, 2017

(65) Prior Publication Data
US 2018/0219263 A1    Aug. 2, 2018

(30) Foreign Application Priority Data
Jul. 31, 2015  (JP) ................................ 2015-151606

(51) Int. Cl.
*H01M 10/42* (2006.01)
*H01M 10/44* (2006.01)
(Continued)

(52) U.S. Cl.
CPC ....... *H01M 10/4257* (2013.01); *H01M 10/44* (2013.01); *H01M 10/48* (2013.01);
(Continued)

(58) Field of Classification Search
CPC .. H01M 10/4257; H01M 10/44; H01M 10/48; H01M 10/613; H01M 10/625;
(Continued)

(56) References Cited

U.S. PATENT DOCUMENTS

| 2010/0085019 A1 | 4/2010 | Masuda |
| 2012/0200263 A1 | 8/2012 | Masuda |

FOREIGN PATENT DOCUMENTS

| JP | 2009-080093 A | 4/2009 |
| JP | 2010-093871 A | 4/2010 |

(Continued)

OTHER PUBLICATIONS

Extended European Search Report dated Mar. 6, 2019 for the European Patent Application No. 16832633.8.
(Continued)

*Primary Examiner* — Hal Kaplan
(74) *Attorney, Agent, or Firm* — Volpe and Koenig, P.C.

(57) ABSTRACT

A battery control device capable of controlling the deterioration speed of the characteristics of a secondary battery on the basis of the internal resistances of the positive and negative electrodes. The battery control device comprises: a storage unit for holding beforehand a data table DT2 indicating the rate of increase in the resistance of the positive and negative electrodes; and a DT1 calculation unit calculating a data table DT1 representing the correlations among the temperature, the battery state-of-charge and the upper limit current, and the correlations among the temperature, the battery state-of-charge and the lower limit current on the basis of DT2, a positive electrode state-of-charge, a negative electrode state-of-charge, a battery state-of-charge, and an allowed range for the rate of increase in the battery resistance. The battery control device controls the current of the secondary battery on the basis of DT1 calculated by the DT1 calculation unit.

5 Claims, 11 Drawing Sheets

(51) Int. Cl.
  *H01M 10/48*     (2006.01)
  *H02J 7/14*      (2006.01)
  *H01M 10/6563*   (2014.01)
  *H01M 10/613*    (2014.01)

(52) U.S. Cl.
  CPC ......... *H02J 7/1423* (2013.01); *H01M 10/613* (2015.04); *H01M 10/6563* (2015.04); *H01M 2010/4271* (2013.01); *H01M 2220/20* (2013.01); *H02J 2007/143* (2013.01)

(58) Field of Classification Search
  CPC ..... H01M 10/6563; H01M 2010/4271; H01M 2220/20; B60L 50/50; B60L 58/12; B60L 58/26; B60L 3/00; B60W 10/26; B60W 20/00; H02J 7/0072; H02J 7/1423; H02J 2007/143; Y02T 10/6234; Y02T 10/7005
  USPC .................................. 307/9.1, 10.1
  See application file for complete search history.

(56) References Cited

FOREIGN PATENT DOCUMENTS

JP    2012-244723 A    12/2012
JP    2013-046446 A     3/2013
WO    2015/059738 A1    4/2015

OTHER PUBLICATIONS

International Search Report dated Sep. 6, 2016 of International Application No. PCT/JP2016/068451.

FIG. 10

| | CONDITION A | | | CONDITION B | | | CONDITION C | | |
|---|---|---|---|---|---|---|---|---|---|
| REQUESTED OUTPUT (W) | 22 | 35 | 10 | 22 | 35 | 10 | 22 | 35 | 10 |
| SECONDARY BATTERY OUTPUT (W) | 22 | 31.4 | 10 | 21.6 | 21.6 | 10 | 22 | 35 | 10 |
| TEMPERATURE ADJUSTMENT OUTPUT (W) | 4.39 | 19.89 | 0 | 8.42 | 8.42 | 0.81 | 4.39 | 12.88 | 0.81 |
| TEMPERATURE AFTER LAPSE OF TEN SECONDS (°C) | 40 | 36.7 | 40.3 | 38.6 | 38.6 | 40 | 40 | 40 | 40 |
| RESISTANCE INCREASE RATE (mΩ/YEAR) | 2.59 | 3.11 | 2.02 | 2.55 | 2.55 | 2.01 | 2.59 | 3.36 | 2.01 |

(DATA TABLE DT1)

(DATA TABLE DT1)

FIG. 12A
DT10

| Temperature T(deg.C) | State-of-charge Qp (Ah) | Resistance Rp (Ohm) |
|---|---|---|
| T1 | Qp,1 | Rp,1 |
| T1 | Qp,2 | Rp,2 |
| ... | | |
| T1 | Qp,m-1 | Rp,m-1 |
| T1 | Qp,m | Rp,m |
| ... | | |
| Tl | Qp,1 | Rp,1 |
| Tl | Qp,2 | Rp,2 |
| ... | | |
| Tl | Qp,m-1 | Rp,m-1 |
| Tl | Qp,m | Rp,m |

FIG. 12B
DT11

| Temperature T(deg.C) | State-of-charge Qn (Ah) | Resistance Rn (Ohm) |
|---|---|---|
| T1 | Qn,1 | Rn,1 |
| T1 | Qn,2 | Rn,2 |
| ... | | |
| T1 | Qn,o-1 | Rn,o-1 |
| T1 | Qn,o | Rn,o |
| ... | | |
| Tl | Qn,1 | Rn,1 |
| Tl | Qn,2 | Rn,2 |
| ... | | |
| Tl | Qn,o-1 | Rn,o-1 |
| Tl | Qn,o | Rn,o |

BATTERY CONTROL DEVICE

TECHNICAL FIELD

The present invention relates to a battery control device for controlling a secondary battery.

BACKGROUND ART

In recent years, efforts to efficiently utilize energy are being made by using a secondary battery such as a lithium-ion battery for a power supply system of a vehicle or a power supply system of a smart house. Increasing the charging/discharging amount of the secondary battery is often effective for enhancing the energy efficiency of a system as a whole. However, it is known that increasing the charge/discharge amount causes the deterioration in characteristics of the secondary battery. In particular, there arises a problem that the internal resistance of the secondary battery increases, and consequently input-output characteristics deteriorate.

Thus, there is an inverse relationship between the instantaneous energy efficiency of the system as a whole and the deterioration in characteristics of the secondary battery. Meanwhile, a use period of the power supply for the above use extends over a long period. Therefore, it is preferable to use the secondary battery in such a manner that the energy efficiency over the whole assumed use period becomes the maximum. For this purpose, it is necessary to control the charge/discharge amount of the secondary battery in such a manner that the deterioration in characteristics of the secondary battery falls within a predetermined range.

It is known that, in general, the deterioration in characteristics of the secondary battery progresses fast when a voltage of the secondary battery is too high or too low. In actuality, the voltage of the secondary battery is a difference between a positive electrode potential and a negative electrode potential of the secondary battery, and therefore the speed of the deterioration in characteristics is determined not by a battery voltage but by the positive electrode potential and the negative electrode potential. Therefore, correctly detecting the positive electrode potential and the negative electrode potential of the secondary battery, and then selecting the optimum battery operation according to the detected electric potentials, is effective as a means for suppressing the deterioration. For example, PTL 1 discloses a method in which deterioration states of a positive electrode, a negative electrode and an electrolyte solution are quantitatively evaluated in a nondestructive manner by using a charging/discharging curve of the secondary battery to determine an open circuit potential of the positive electrode and an open circuit potential of the negative electrode.

PTL 1 describes a state determination method for determining a state of a secondary battery, and describes a method in which a charging/discharging curve of the secondary battery is reproduced by calculation on the basis of separate charging/discharging curves of a positive electrode and a negative electrode stored beforehand, and in the process of the reproduction, an effective weight of a positive electrode active material, an effective weight of a negative electrode active material, a deviation in capacitance between the positive electrode and the negative electrode, and a positive electrode potential and a negative electrode potential corresponding to an open circuit voltage of the secondary battery are obtained. In addition, PTL 1 indicates that the secondary battery is controlled by using the positive electrode potential and the negative electrode potential that have been obtained, which enables to achieve a higher degree of safety of the secondary battery, and to suppress the deterioration in characteristics in comparison with the control based on the battery voltage in the prior art.

CITATION LIST

Patent Literature

PTL 1: JP 2009-80093 A

SUMMARY OF INVENTION

Technical Problem

However, the state determination method described in PTL 1, and the method for suppressing the deterioration in characteristics described in PTL 1, are methods that relate to the capacitance of the secondary battery. Thus, a method for controlling an increase in the internal resistance of the secondary battery is not disclosed.

Solution to Problem

The battery control device according to the present invention includes: a storage unit that stores beforehand first data indicating a resistance increase rate of a positive electrode of a secondary battery, and second data indicating a resistance increase rate of a negative electrode of the secondary battery; and a correlation calculation unit that calculates first correlations representing correlations among an upper limit current of the secondary battery, a battery state-of-charge, and a temperature, and second correlations representing correlations among a lower limit current of the secondary battery, the battery state-of-charge, and the temperature, on the basis of an allowable range of a battery resistance increase rate of the secondary battery, the battery state-of-charge, a positive electrode state-of-charge, a negative electrode state-of-charge, the first data and the second data, wherein a current of the secondary battery is controlled on the basis of the first correlations and the second correlations calculated by the correlation calculation unit.

Advantageous Effects of Invention

According to the present invention, the speed of deterioration in characteristics of the secondary battery can be controlled on the basis of the internal resistances of the positive and negative electrodes of the secondary battery.

BRIEF DESCRIPTION OF DRAWINGS

FIG. 10 is a table comparatively illustrating the results of current control performed under three kinds of conditions.

FIG. 12A shows a Table illustrating a relationship $Rp(Qp, T)$ among the positive electrode state-of-charge $Qp$, the temperature $T$ and the resistance $Rp$.

FIG. 12B shows a Table illustrating a relationship $Rn(Qn, T)$ maong the negative electrode state-of-charge $Qn$, the temperature $T$ and the resistance $Rn$.

DESCRIPTION OF EMBODIMENTS

Figure 1:
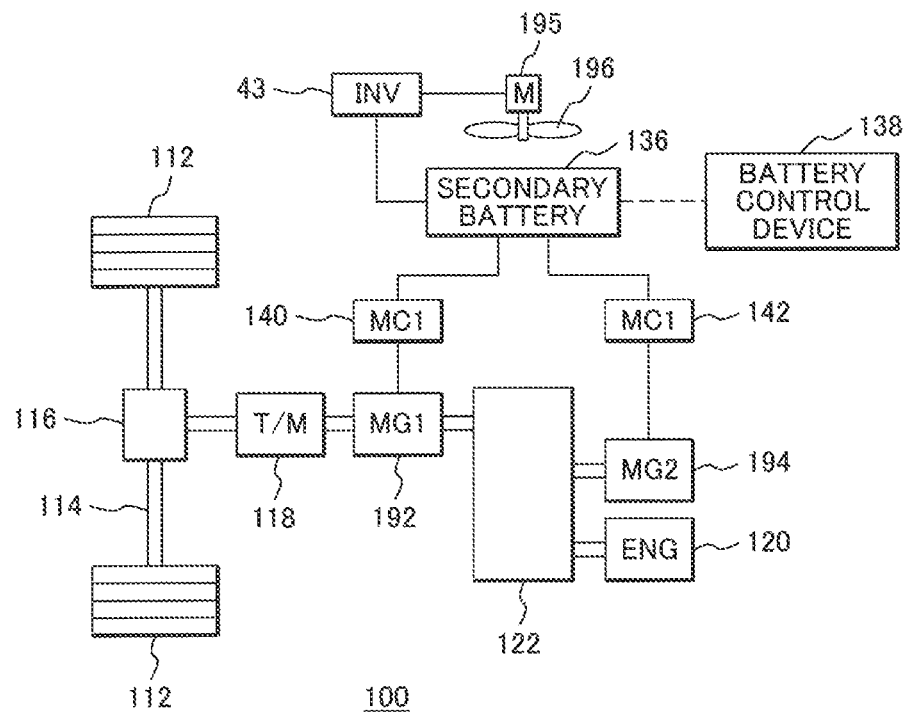
FIG. 1 is a diagram illustrating a battery system provided with a battery control device according to the present embodiment.

Embodiments of the present invention will be described below with reference to the accompanying drawings. FIG. 1 is a diagram illustrating a battery system provided with a battery control device according to the present embodiment. A battery system 100 shown in FIG. 1 is a battery system of a hybrid electric vehicle. The hybrid electric vehicle in FIG. 1 is provided with two vehicle driving systems. One of the vehicle driving systems is an engine system that uses, as a power source, an engine 120 that is an internal combustion engine. The engine system is mainly used as a driving source of the HEV.

The other is an in-vehicle electric machine system that uses motor generators 192, 194 as power sources. The in-vehicle electric machine system is mainly used as a driving source and an electric power generation source of the hybrid electric vehicle. Each of the motor generators 192, 194 is, for example, a synchronous machine or an induction machine, and operates as both a motor and a power generator depending on an operating method. Therefore, the motor generators 192, 194 are called motor generators here.

In a front part of a vehicle body, a front wheel axles 114 is pivotally supported so as to be rotatable. Both ends of the front wheel axle 114 are provided with a pair of front wheels 112. In a rear part of the vehicle body, a rear wheel axle (illustration is omitted) is pivotally supported so as to be rotatable. Both ends of the rear wheel axle are provided with a pair of rear wheels. The hybrid electric vehicle according to the present embodiment employs, what is called, a front wheel drive system in which the front wheels 112 are used as main wheels driven by motive power, whereas the rear wheels are used as trailing wheels that follow the traveling of the main wheels. However, a system reverse to the front wheel drive system, that is to say, a rear wheel drive system, may be employed.

A central part of the front wheel axle 114 is provided with a front wheel side differential gear (hereinafter referred to as "front wheel side DEF") 116. The front wheel axle 114 is mechanically connected to the output side of the front wheel side DEF 116. An output shaft of a transmission 118 is mechanically connected to the input side of the front wheel side DEF 116. The front wheel side DEF 116 is a differential motive power distribution mechanism that distributes a rotational driving force into the right and left parts of the front wheel axle 114, the rotational driving force having been speed-changed and transferred by the transmission 118. The output side of the motor generator 192 is mechanically connected to the input side of the transmission 118. The output side of the engine 120 and the output side of the motor generator 194 are mechanically connected to the input side of the motor generator 192 through a motive power distribution mechanism 122. Incidentally, the motor generators 192, 194 and the motive power distribution mechanism 122 are stored inside a housing of the transmission 118.

Each of the motor generators 192, 194 is a synchronous machine in which a rotor is provided with a permanent magnet. By controlling an alternating-current power to be supplied to an armature winding of a stator by motor controllers 140, 142, driving of the motor generators 192, 194 are controlled. A secondary battery 136 is electrically connected to the motor controllers 140, 142, and the electric power can be transmitted/received between the secondary battery 136 and each of the motor controllers 140, 142. For example, a lithium-ion battery is used as the secondary battery 136.

In this manner, in the present embodiment, there are provided a first electrically-driven power generation unit that consists of the motor generator 192 and the motor controller 140, and a second electrically-driven power generation unit that consists of the motor generator 194 and the motor controller 142. The two electrically-driven power generation units are properly used according to an operation state. In addition, in the present embodiment, by using the electric power of the secondary battery 136 to operate the first electrically-driven power generation unit as an electrically-driven unit, the vehicle can be driven only by the motive power of the motor generator 192. Further, by using the motive power of the engine 120 or the motive power from the wheels to operate the first electrically-driven power generation unit or the second electrically-driven power generation unit as a power generation unit, and thereby to generate the electric power, the secondary battery 136 can be charged.

Moreover, the secondary battery 136 is also used as a power supply for driving a motor 195 of a cooling fan 196 that cools the secondary battery 136. A direct-current power is supplied from the secondary battery 136 to an inverter device 43, is converted into an alternating-current power by the inverter device 43, and is supplied to the motor 195 for driving the cooling fan.

The secondary battery 136 is controlled by a battery control device 138. The battery control device 138 is an electronic circuit that is composed of a plurality of electronic circuit components, and is configured to be functionally separated into two hierarchies, an upper-level control unit and a lower-level control unit. The lower-level control unit manages and controls respective states of a plurality of battery cells that constitute the secondary battery 136. More specifically, the lower-level control unit detects respective voltages and abnormalities (overcharging/overdischarging) of the plurality of battery cells, and adjusts states of charge between the plurality of battery cells.

The upper-level control unit manages and controls a state of the secondary battery 136. More specifically, the upper-level control unit estimates and calculates a state of charge and a deterioration state of the secondary battery 136, and calculates allowable values of charging/discharging of the secondary battery 136 to provide the motor controllers 140, 142 with the allowable values, thereby controlling charging/discharging of the secondary battery 136 within a range of the allowable values.

(Explanation of Battery Control)

Figure 2:
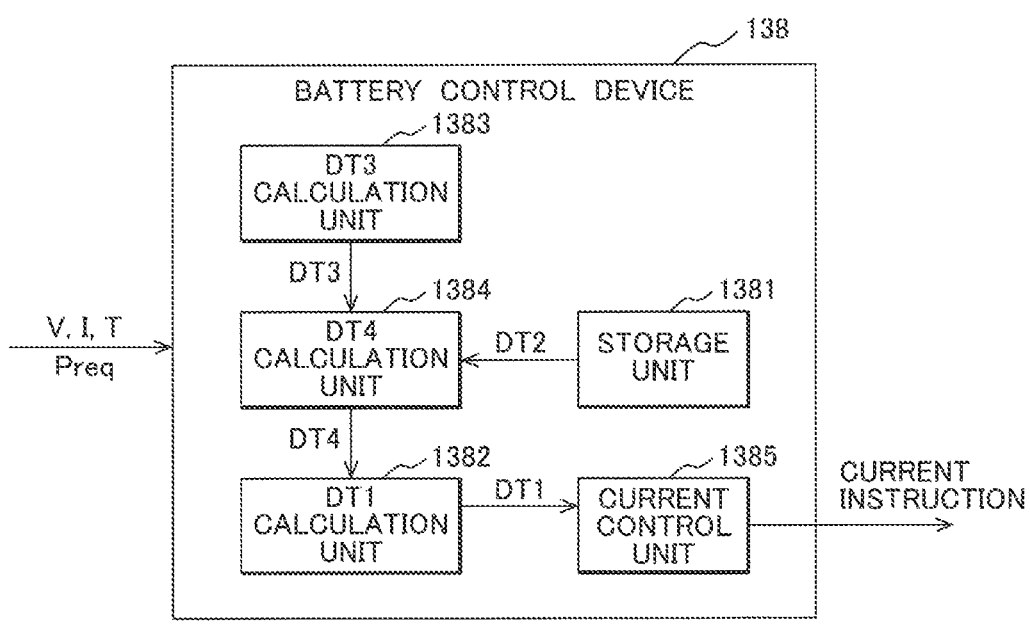
FIG. 2 is a block diagram illustrating an example of a battery control device.

Next, the battery control by the battery control device 138 will be described. FIG. 2 is a block diagram illustrating an example of the battery control device 138. The battery control device 138 is provided with a storage unit 1381, a DT1 calculation unit 1382, a DT3 calculation unit 1383, a DT4 calculation unit 1384, and a current control unit 1385. The storage unit 1381 stores beforehand a data table DT1 (details will be described below) in an initial state shown in FIGS. 11A and 11B. As described below, when the battery system is started, the data table DT1 based on a battery deterioration state at that point of time is calculated, and is then stored in the storage unit 1381.

Figure 11A:
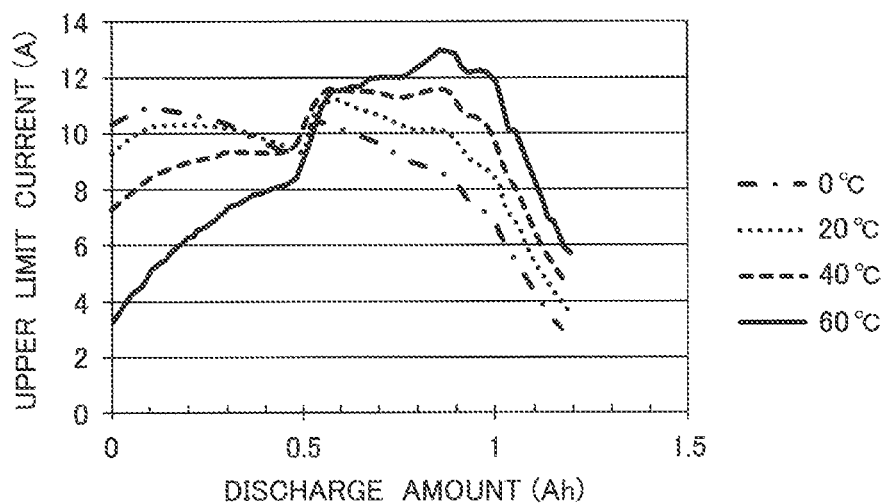
FIGS. 11A and 11B show charts partially illustrating the data table DT1 for a secondary battery having a capacitance of 1.2 (Ah), and having an internal resistance of 50 (mΩ)).

The data table DT1 is a data table that defines an upper limit current Imax and a lower limit current Imin for a state-of-charge Q and a temperature T of the secondary battery 136. As described above, the data table DT1 shown in FIGS. 11A and 11B partially indicates a data table for an initial state in which the secondary battery 136 has experienced no deterioration, has a capacitance of 1.2 (Ah), and has an internal resistance of 50 (mΩ). It should be noted that in FIGS. 11A and 11B, the state-of-charge Q is represented by the discharge amount from a fully charged state of the secondary battery 136. FIG. 11A indicates the upper limit current Imax, and FIG. 11B indicates the lower limit current Imin. Here, the upper limit current Imax corresponds to a current obtained when the internal resistance increases by 3 (mΩ) per year, and the lower limit current Imin corresponds to a current obtained when the internal resistance increases by 2 (mΩ) per year.

When a current value I of the secondary battery 136 exceeds the upper limit current Imax, a speed of deterioration in characteristics of the secondary battery 136 exceeds an assumed value. Meanwhile, when the current value I of the secondary battery 136 is lower than the lower limit current Imin, the speed of deterioration in characteristics of the secondary battery 136 is lower than the assumed value.

As a method for indicating the state-of-charge Q of the secondary battery 136 in the data table DT1, there is, for example, a method in which a discharge capacity from a fully charged state to a fully discharged state is divided into 100, and the fully charged state is indicated as 100, whereas the fully discharged state is indicated as 0. Alternatively, there is also a method in which the discharge amount from the fully charged state, the charge amount from the fully discharged state, or an open circuit voltage of the secondary battery 136 is used as the state-of-charge.

Figure 3:
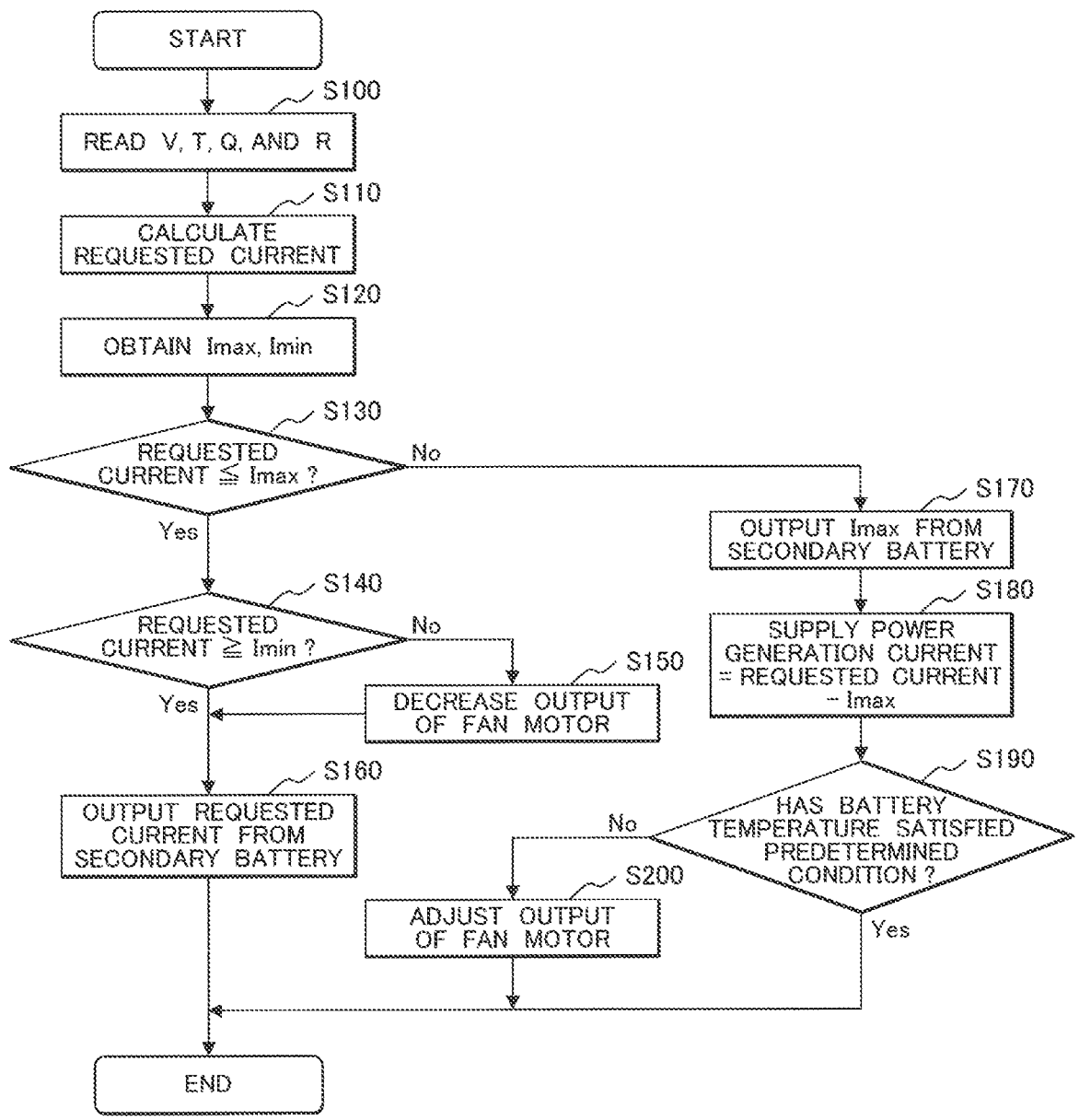
FIG. 3 is a flowchart illustrating an example of battery control that uses a data table DT1.

FIG. 3 is a flowchart illustrating an example of the battery control that uses the data table DT1. The flowchart is executed by the battery control device 138. The flowchart shown in FIG. 3 is started when an output request to the motor generator 192, which is a main energy consuming part, is made. Here, the following description will be given on the assumption that a state of the secondary battery 136 is an initial state in which no deterioration has been experienced. In other words, the data table DT1 in FIGS. 11A and 11B is used.

Figure 11B:
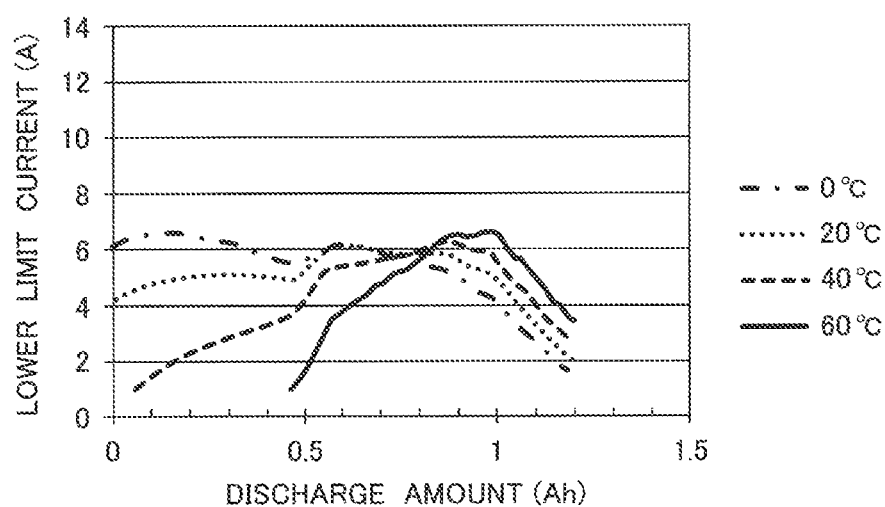

It should be noted that when the system is started, the data table DT1 based on a deterioration state of the secondary battery 136 is calculated, and therefore the data table DT1 in FIGS. 11A and 11B is used until the new data table DT1 is calculated. After the data table DT1 based on the deterioration state is newly calculated, the battery control shown in FIG. 3 is executed by using the calculated data table DT1.

In a step S100, the battery control device 138 reads, from the storage unit 1381, a voltage V, a temperature T, a state-of-charge Q and an internal resistance R of a battery, which have been measured or calculated beforehand. Here, the voltage V of the battery is a voltage of the battery cells that constitute the secondary battery 136. An average value of voltages of the battery cells, which have been detected by the above-described lower-level control unit, or a voltage obtained by converting a measured voltage of the secondary battery 136 into a voltage per battery cell, is used as the voltage V.

In a step S110, a requested current Ireq is calculated from a requested output Preq, the battery voltage V and the internal resistance R received from the motor controller 140 by using, for example, the following equation (1).

$$Preq=(V-Ireq\cdot R)\times Ireq \qquad (1)$$

In a step S120, the upper limit current Imax and the lower limit current Imin corresponding to the state-of-charge Q and the temperature T that have been read are read from the data table DT1. Next, in a step S130, a determination is made as to whether or not the requested current Ireq is the upper limit current Imax or lower. When it is determined in the step S130 that the requested current Ireq≤the upper limit current Imax, the process proceeds to a step S140, and when it is determined that the requested current Ireq>the upper limit current Imax, the process proceeds to a step S170. In the step S140, a determination is made as to whether or not the requested current Ireq is the lower limit current Imin or higher. When it is determined in the step S140 that the requested current Ireq≥the lower limit current Imin, the process proceeds to a step S160, and when it is determined that the requested current Ireq<the lower limit current Imin, the process proceeds to a step S150.

When the process proceeds to the step S160, in other words, when it is determined that the requested current Ireq is lower than the upper limit current Imax and is higher than the lower limit current Imin, the battery control device 138 causes the secondary battery 136 to output the requested current Ireq.

Here, a case of the data table DT1 in FIGS. 11A and 11B will be specifically described. It is assumed that when a request to output Preq=22 (W) to the motor generator 192 as a main energy consuming part is made, the secondary battery 136 has a temperature of 40° C., a voltage of 4.0 (V), a discharge amount of 0.5 (Ah) as a state-of-charge, and an internal resistance of 50 (mΩ)). In this case, the requested current Ireq is calculated to be approximately 5.9 (A) by the equation (1). In FIGS. 11A and 11B, when data corresponding to T=40° C. and the discharge amount=0.3 (Ah) is checked, the upper limit current is approximately 9.5 (A), and the lower limit current is approximately 3.0 (A). Therefore, the process proceeds from the step S130, through the step S140, to the step S160, and the battery control device 138 causes the secondary battery 136 to output a current equivalent to a current value of 5.9 (A).

Meanwhile, when it is determined in the step S130 that the requested current Ireq>the upper limit current Imax, the battery control device 138 causes the secondary battery 136 to output the upper limit current Imax in the step S170, and further in a step S180, the battery control device 138 causes the motor generator 194 to generate an electric power, thereby supplying the motor generator 192 with a current equivalent to a difference between the requested current Ireq and the upper limit current Imax.

In a step S190, a determination is made as to whether or not the battery temperature T satisfies a predetermined condition. When it is determined that the battery temperature T does not satisfy the predetermined condition, the process proceeds to a step S200, and the output of the motor 195 for rotating the cooling fan 196 is adjusted in such a manner that the battery temperature T satisfies the predetermined condition. As the condition employed above, there can be mentioned, for example, a condition that the battery temperature T is a predetermined lowest temperature Tmin or higher, and is a highest temperature Tmax or lower. In addition, there can be mentioned a condition that in the data table DT1, when the battery temperature T is decreased or increased by a fixed amount from a current value, a value of the upper limit current Imax increases by a fixed amount or more.

Processing from the step S170 to the step S200 will be specifically described by using the data table DT1 shown in FIGS. 11A and 11B. It is assumed that when a request to output Preq=35 (W) to the motor generator 192 is made, the battery has a temperature of 40° C., a voltage of 4.0 (V), a discharge amount of 0.3 (Ah) as a state-of-charge, and an internal resistance of 50 (mΩ)). In this case, the requested current Ireq is calculated to be approximately 11.7 (A) by the above-described equation (1).

In FIGS. 11A and 11B, when data corresponding to T=40° C. and the discharge amount=0.3 (Ah) is checked, the upper limit current Imax is approximately 9.5 (A), and the lower limit current Imin is approximately 3.0 (A). Therefore, in this case, the requested current Ireq exceeds the upper limit current Imax, and therefore the battery control device 138 causes the secondary battery 136 to output 9.5 (A) that is the upper limit current Imax (step S170). At the same time, the battery control device 138 causes the motor generator 194 to generate an electric power, thereby supplying the motor generator 192 with a current of 2.1 (A) that is a difference between the requested current Ireq and the upper limit current Imax (step S180).

Incidentally, referring to FIGS. 11A and 11B, it is revealed that when the discharge amount=0.3 (Ah), decreasing the temperature of the secondary battery 136 causes a value of the upper limit current Imax to increase. Accordingly, the output of the motor 195 that is an energy consuming part is increased to cool the secondary battery 136. As the result, the battery temperature T decreases, and the value of the upper limit current Imax increases. Therefore, the deterioration of the secondary battery 136 can be suppressed.

The processing from the step S170 to the step S200 increases the power generation current and the output of the motor 195 in this manner, and therefore the energy efficiency of the system as a whole temporarily decreases. Meanwhile, since the battery temperature T decreases, the deterioration in characteristics of the secondary battery 136 is suppressed, and consequently a decrease in the energy efficiency of the system as a whole is suppressed over the whole assumed use period.

In addition, when it is determined in the step S140 that the requested current Ireq<the lower limit current Imin, the process proceeds to the step S150, and the output of the motor 195 is decreased or stopped. Subsequently, the process proceeds to the step S160, and the secondary battery 136 is caused to output the requested current Ireq. Performing such processing results in a decrease in the function of controlling the temperature T of the secondary battery 136, and therefore the deterioration in characteristics of the secondary battery 136 progresses. Meanwhile, since the energy consumption of the secondary battery system as a whole decreases, the energy efficiency increases.

For example, it is assumed that when a request to output Preq=10 (W) to the motor generator 192 is made, the secondary battery 136 has a temperature of 40° C., a voltage of 4.0 (V), a discharge amount of 0.3 (Ah) as a state-of-charge, and an internal resistance of 50 (mΩ)). In this case, the requested current Ireq is calculated to be approximately 2.6 (A) by the above-described equation (1). Here, in FIGS. 11A and 11B, when data corresponding to T=40° C. and the discharge amount=0.3 (Ah) is checked, the upper limit current Imax is approximately 9.5 (A), and the lower limit current Imin is approximately 3.0 (A). Therefore, in this case, the requested current Ireq is lower than the lower limit current Imin. In this case, the battery control device 138 causes the secondary battery 136 to output a current of 2.6 (A) that is the requested current. At the same time, the output of the motor 195 is decreased, and a temperature control function of the secondary battery 136 is decreased.

As described above, performing the current control such as that shown in FIG. 3 on the basis of the data table DT1 in FIGS. 11A and 11B enables to prevent the deterioration in characteristics of the secondary battery 136 from exceeding an assumed range. Moreover, when the deterioration in characteristics of the secondary battery 136 is lower than the assumed range, the energy efficiency of the system as a whole can be enhanced in exchange for the acceleration of the deterioration in characteristics of the secondary battery 136, and consequently the energy efficiency over the whole assumed use period of the secondary battery system can be enhanced. Therefore, the current of the secondary battery can be controlled in such a manner that the deterioration in characteristics of the secondary battery falls within a predetermined range. It should be noted that although the current control at the time of discharging is shown in FIG. 3, the present invention can also be similarly applied to the control at the time of charging of the secondary battery 136.

(Calculation Method of Data Table DT1)

Figure 4:
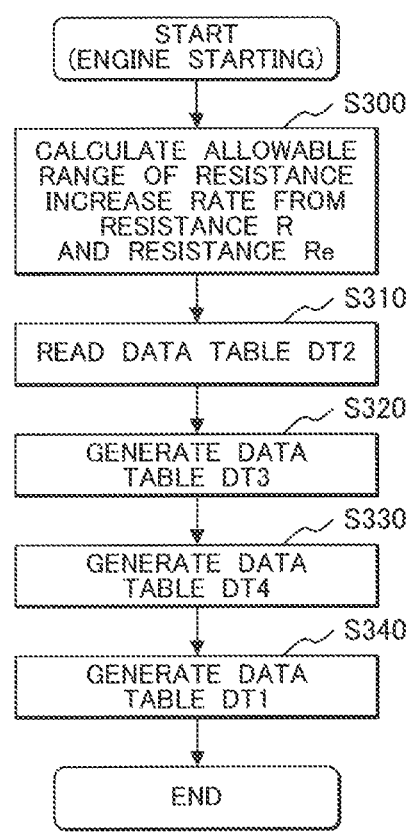
FIG. 4 is a flowchart illustrating, as an example, a calculation method of the data table DT1 based on a deterioration state.

Incidentally, as described above, when the battery system is started, the data table DT1 based on a deterioration state of the secondary battery 136 is calculated, and the control shown in FIG. 3 is then performed on the basis of the data table DT1. FIG. 4 is a flowchart illustrating, as an example, a calculation method of the data table DT1 based on a deterioration state. Processing shown in FIG. 4 is executed when the battery system is started, in other words, when the hybrid electric vehicle shown in FIG. 1 is started. In other words, every time the hybrid electric vehicle is started, the data table DT1 based on a deterioration state of the secondary battery 136 at that point of time is calculated.

First of all, the storage unit 1381 (refer to FIG. 2) of the battery control device 138 stores beforehand a data table (hereinafter referred to as "data table DT2") of resistance increase rates Rp'(Qp, T, I), Rn'(Qn, T, I) for the respective positive and negative electrodes that constitute the battery. The resistance increase rate Rp' depends on a positive electrode state-of-charge Qp, the temperature T of the battery, and a current I that flows through the battery. Similarly, the resistance increase rate Rn' depends on a negative electrode state-of-charge Qn, the temperature T of the battery, and the current I that flows through the battery.

It should be noted that the resistance increase rates Rp', Rn' may be defined as respective increasing rates with respect to the current positive electrode resistance Rp and the current negative electrode resistance Rn, or may be defined as respective increasing rates with respect to the proper reference values Rp0, Rn0 of the resistances of the positive and negative electrodes.

Figure 5A:
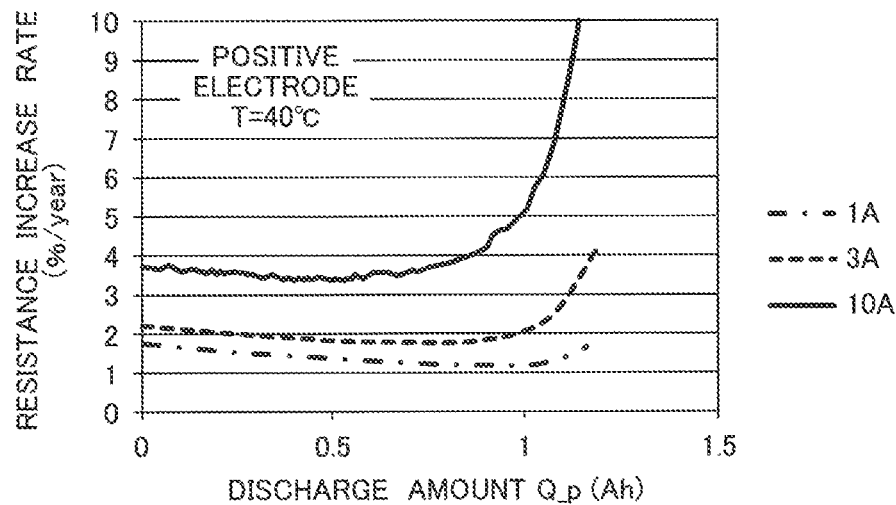
FIGS. 5A and 5B show charts illustrating, as an example, a data table DT2 for a positive electrode and a negative electrode each having a capacitance of 1.2 Ah.
Figure 5B:
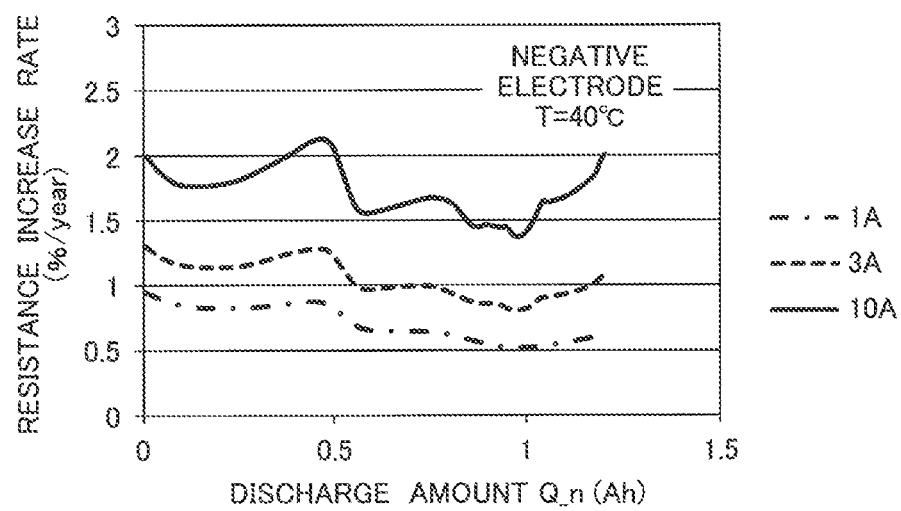

FIGS. 5A and 5B show charts illustrating, as an example, the data table DT2 for a positive electrode and a negative electrode each having a capacitance of 1.2 Ah. FIG. 5A partially illustrates the data table DT2 for the positive electrode, and indicates data obtained when the temperature is 40° C., and when current values are 1 (A), 3 (A) and 10 (A). FIG. 5B partially illustrates the data table DT2 for the negative electrode, and indicates data obtained when the temperature is 40° C., and when current values are 1 (A), 3 (A) and 10 (A). The vertical axis represents a resistance increase rate (%/year), and the horizontal axis represents a state-of-charge of the positive electrode in terms of the discharge amount.

It should be noted that FIGS. 5A and 5B illustrate the data table DT2 in an initial state in which the battery has experienced no deterioration. In addition, the resistance increase rate is an increasing rate with reference to a resistance value of 50 (mΩ)) in the initial state.

(Step S300)

In a step S300 in FIG. 4, the DT1 calculation unit 1382 calculates an allowable range of the resistance increase rate on the basis of a resistance value R of the secondary battery 136 at the present point of time, a resistance Re at the end (EOL: End of Life) of the assumed use period of the secondary battery system, and the time te until the end of the assumed use period. The resistance Re and the time te are stored in the storage unit 1381 beforehand.

As the resistance value at the present point of time, the resistance value R of the secondary battery is measured by using, for example, a method in which a predetermined current value of a current is discharged for a predetermined period of time from a resting state to measure a battery voltage, and a voltage difference from the battery voltage in the resting state is divided by the current value. The measured value is used as the resistance value at the present point of time. In addition, the resistance value obtained as described above is stored beforehand, and the stored resistance value R may be read and used as the resistance value at the present point of time.

The method for calculating an allowable range of the resistance increase rate may be arbitrarily selected. However, for example, a method in which a target resistance increase rate R' is a value calculated by R'=(Re−R)/te, the upper limit value Rmax' of the resistance increase rate is calculated by Rmax'=1.2×R', and the lower limit value Rmin' is calculated by Rmin'=0.8×R' is mentioned as an example. For example, in a case where the internal resistance of the secondary battery is 50 (mΩ), when it is desired that the internal resistance after a lapse of ten years is 75 (mΩ), the resistance increase rate is calculated as follows: (75−50)/10=2.5 (mΩ/year). In addition, the upper limit value Rmax' of the resistance increase rate is calculated by Rmax'=2.5×1.2=3.0 (mΩ/year), and the lower limit value Rmin' is calculated by Rmin'=2.5×0.8=2.0 (mΩ/year). In other words, from 2.0 to 3.0 (mΩ/year) is the allowable range of the resistance increase rate.

Alternatively, the allowable range may be set as follows. It is assumed that the secondary battery 136 is used for three years, and consequently the internal resistance becomes 60 (mΩ)), and the capacitance of the battery becomes 1.0 (Ah). In this case, since the above-described lapse of ten years includes a lapse of seven years, when it is desired that the internal resistance after the lapse of seven years is 75 (mΩ)) that is the same as the above case, the resistance increase rate is calculated as follows: (75−60)/7=2.14 (mΩ/year). In this case, the upper limit value of the resistance increase rate is calculated as follows: 2.14×1.2=2.57 (mΩ/year); and the lower limit value of the resistance increase rate is calculated as follows: 2.14×0.8=1.71 (mΩ/year). In this case, the allowable range of the resistance increase rate is from 1.71 to 2.57 (mΩ/year).

(Step S310)

In a step S310, the current control unit 1385 reads the data table DT2 stored in the storage unit 1381 beforehand.

(Step S320)

In a step S320, the DT3 calculation unit 1383 of the battery control device 138 generates a data table DT3 that indicates the relationship among the state-of-charge Q of the secondary battery 136, the positive electrode state-of-charge Qp, and the negative electrode state-of-charge Qn.

A method for generating the data table DT3 may be arbitrarily selected. There is, for example, the method described in the PTL 1. In addition, for example, a method such as that described below can be mentioned. First of all, the DT3 calculation unit 1383 holds a battery capacitance W0 in an initial state before deterioration, a battery capacitance W at the present point of time, and constants Dp, Dn. The battery capacitance W at the present point of time is calculated by using a well-known method. For example, the state-of-charge (SOC: State of Charge) at that point of time is calculated from a voltage obtained when the system is resting, and a battery capacitance (fully charged capacitance) is calculated on the basis of an integration value (∫Idt) of a current between rests, and a change in state-of-charge ΔSOC. Alternatively, a change in battery capacitance may be estimated from a change in internal resistance.

Here, it is assumed that the battery state-of-charge Q, and the states-of-charge Qp, Qn of the positive and negative electrodes are expressed as the discharge amounts (that is to say, the discharge electric amount Ah) from the respective fully charged states. In addition, in the data table DT3 in the initial state, the relationship among the battery state-of-charge Q, and the states-of-charge Qp, Qn of the positive and negative electrodes is expressed as follows: Qp=Q−Dp; Qn=Q−Dn.

Next, the DT3 calculation unit 1383 determines a new constant Dn'=Dn+(W0−W) at the present point of time by using a decrement (W0−W) of the battery capacitance at the present point of time. A constant Dp' is determined as follows: Dp'=Dp=0. In addition, the battery state-of-charge Q, the positive electrode state-of-charge Qp, and the negative electrode state-of-charge Qn in the data table DT3 at the present point of time are represented as follows: Q, Qp=Q−Dp', Qn=Q−Dn'.

For example, it is assumed that the battery capacitance is 1.2 (Ah), and Dp=Dn=0 in the initial state. In addition, in a case where the secondary battery 136 deteriorates, with the result that the battery capacitance decreases to 1.0 (Ah), Dp', Dn' are determined as follows: Dp'=0, Dn'=0+(1.2−1.0)=0.2. With respect to the battery state-of-charge Q at the time of deterioration, the positive electrode state-of-charge Qp, and the negative electrode state-of-charge Qn are determined as follows: Qp=Q, Qn=Q−0.2. This indicates correspondence of the state-of-charge obtained when the battery capacitance has deteriorated to 1.0 (Ah).

Figure 6:
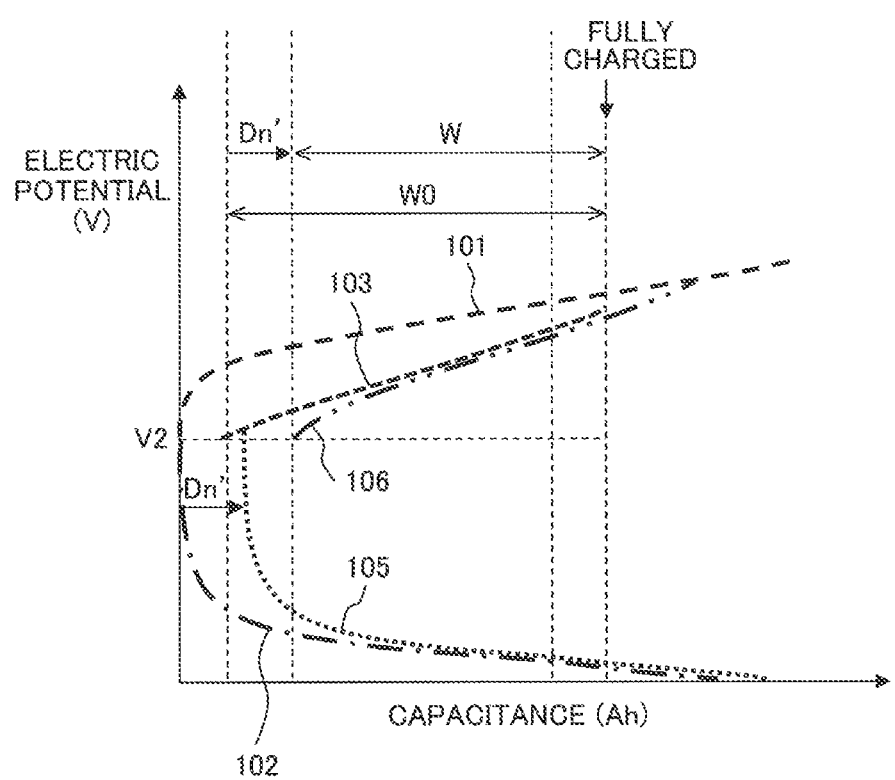
FIG. 6 is a chart illustrating a positive electrode potential curve and a negative electrode potential curve.

This will be described below by using a positive electrode potential curve and a negative electrode potential curve shown in FIG. 6. In FIG. 6, a negative electrode potential curve 102 and a battery voltage curve 103 indicate potential curves in the initial state. Meanwhile, a negative electrode potential curve 105 and a battery voltage curve 106 indicate potential curves at the time of deterioration. Incidentally, in the above explanation, it is assumed that Dp=Dp'=0. Therefore, the positive electrode potential curve 101 is identical both in the initial state and at the time of deterioration. Changing from Dn=0 to Dn'=0.2 (Ah) at the time of deterioration means that the negative electrode potential curve 102 shifts to the right side by Dn', and consequently changes to the negative electrode potential curve 105. As the result, when the battery is discharged up to a final voltage V1, the capacitance decreases by Dn'. As revealed from FIG. 6, when the negative electrode potential curve 102 shifts to the right side by Dn', the negative electrode state-of-charge Qp at the time of deterioration corresponds to a state-of-charge that is lower than the state-of-charge Q in the initial state by Dn'(Ah).

(Step S330)

In a step S330, the DT4 calculation unit 1384 generates a data table DT4 indicating the relationship among a state-of-charge of the battery, a temperature, a current, and a resistance increase rate of the battery. There are various methods for generating the data table DT4. However, here, the data table DT4 (refer to FIGS. 7A and 7B) is generated by combining the data table DT2 (data table indicating respective resistance increase rates of the positive electrode and the negative electrode) read in the step S310 with the data table DT3 generated in the step S320.

In the data table DT2 shown in FIGS. 5A and 5B, the resistance increase rate Rp' of the positive electrode is provided on the basis of the positive electrode state-of-charge Qp, the temperature T of the battery, and the current value I as indicated in Rp'(Qp, T, I). Similarly, the resistance increase rate Rn' of the negative electrode is provided on the basis of the negative electrode state-of-charge Qn, the temperature T of the battery, and the current value I as indicated in Rn'(Qn, T, I). Meanwhile, in the data table DT4 shown in FIGS. 7A and 7B, the resistance increase rate R' of the battery is provided on the basis of the battery state-of-charge Q, the temperature T of the battery, and the current value I as indicated in R'(Q, T, I).

Figure 7A:
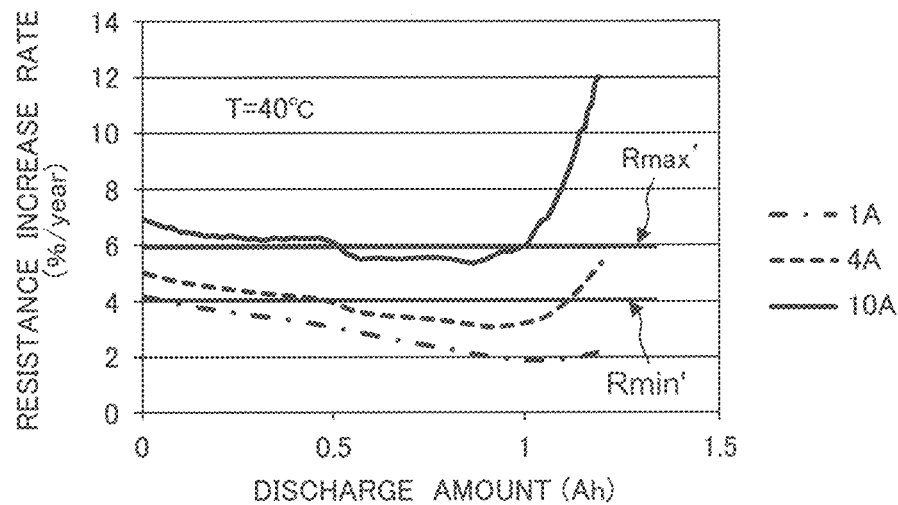
FIGS. 7A and 7B show charts illustrating a data table DT4 in an initial state (W=1.2 Ah) and at the time of deterioration (W=1.0 Ah).
Figure 7B:
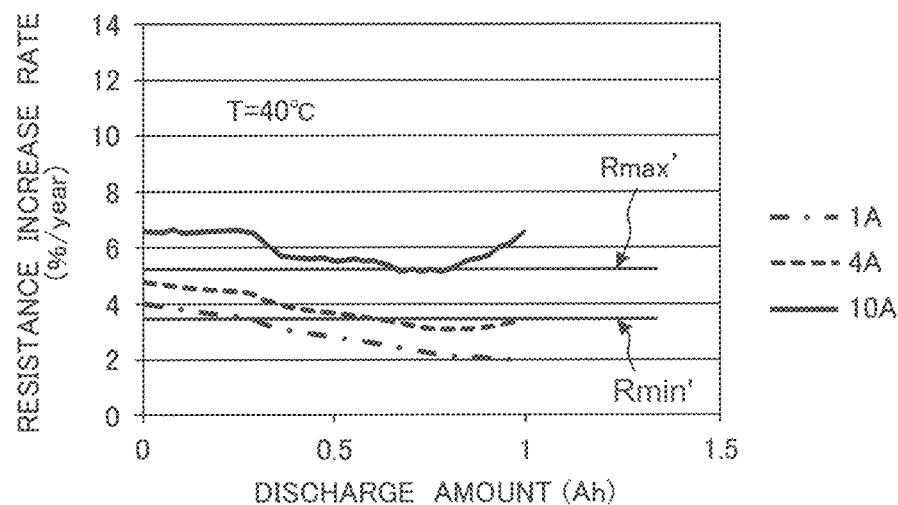

Incidentally, the resistance increase rate R' of the battery is represented by the sum of the resistance increase rate Rp' of the positive electrode and the resistance increase rate Rn' of the negative electrode. For this purpose, it is necessary to convert the data table DT2 in FIGS. 5A and 5B into the resistance increase rates Rp', Rn' of the positive and negative electrodes, which are provided on the basis of the battery state-of-charge Q, the temperature T and the current value I. Therefore, by using the data table DT3 generated in the step S320, in other words, by using the data table indicating the correspondence relationship among the battery state-of-charge Q based on the battery capacitance at the present point of time and the states-of-charge Qp, Qn of the positive and negative electrodes, the data table DT4 shown in FIGS. 7A and 7B is generated from the data table DT2 shown in FIGS. 5A and 5B.

Figure 8A:
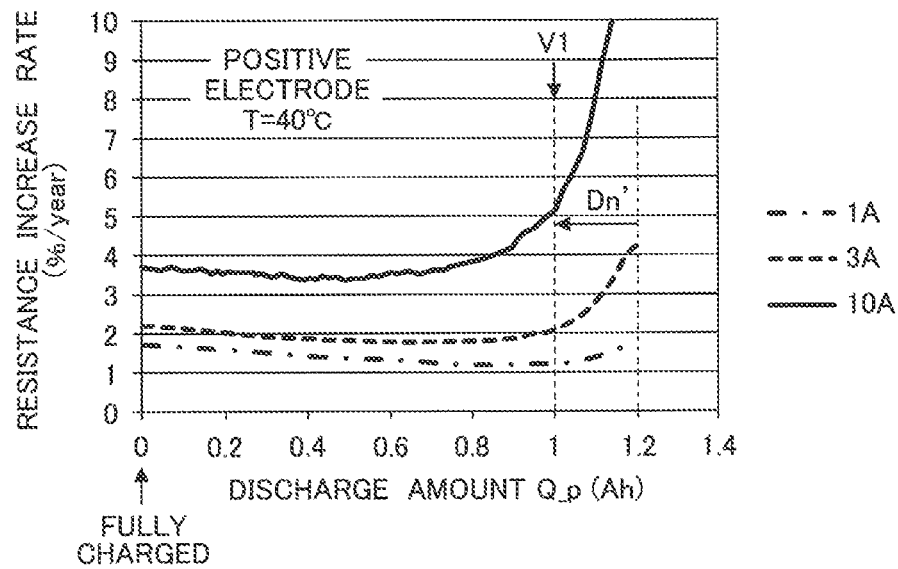
FIGS. 8A and 8B show charts illustrating the scope at the time of deterioration in the data table DT2 shown in FIGS. 5A and 5B.
Figure 8B:
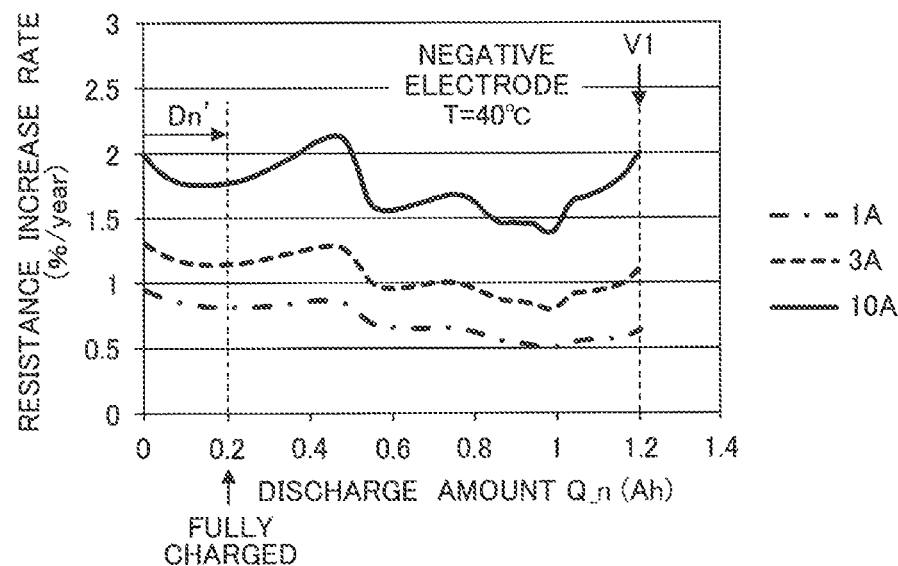

The above case will be described where when the negative electrode potential curve at the time of deterioration shifts by Dn'(Ah), the state-of-charge that is lower than the state-of-charge Q in the initial state by Dn'(Ah) corresponds to the state-of-charge Qp of the negative electrode at the time of deterioration. FIGS. 8A and 8B show charts illustrating the scope at the time of deterioration in the data table DT2 shown in FIGS. 5A and 5B. As described in FIG. 6, the positive electrode potential curve 101 at the time of deterioration is also identical to that in the initial state. Therefore, as shown in FIG. 8A, 0 (Ah) in the initial state corresponds to the fully charged state, and the final voltage V1 in FIG. 6 is reached at 1.0 (Ah).

Meanwhile, the negative electrode potential curve 105 shifts to the right side by Dn'(Ah) as illustrated in FIG. 6. Therefore, as shown in FIG. 8B, a state of Dn'(Ah) in the initial state corresponds to the fully charged state. In addition, when the state-of-charge becomes 1.2 (Ah), the final voltage V1 is reached.

Accordingly, when the data table DT4 related to the state-of-charge Q of the battery at the time of deterioration is generated from the data table DT2 related to the states-of-charge of the positive and negative electrodes shown in FIGS. 8A and 8B, resistance increase rates in apart in which the discharge amounts are equal in the data table DT2 of the positive and negative electrodes are added together, and the obtained value is used as the resistance increase rate of the battery.

For example, the resistance increase rate at the time of full charge is obtained by adding the resistance increase rate of the positive electrode at the time of full charge (the resistance increase rate at 0 (Ah) in FIG. 8A) and the resistance increase rate obtained when the discharge amount of the negative electrode=Dn'(Ah) (the resistance increase rate at Dn'(Ah) in FIG. 8A) together. In addition, the resistance increase rate at the discharge amount Q (that is to say, the state-of-charge Q) is the sum of the resistance increase rate at the discharge amount Q of the positive electrode and the resistance increase rate at the discharge amount Q+Dn' of the negative electrode. The resistance increase rate of the battery at the time of deterioration can be determined from the discharge amount=0 to the discharge amount=W−Dn'=W0 in this manner.

FIG. 7A is a chart illustrating the data table DT4 in the initial state (W=1.2 Ah); and FIG. 7B is a chart illustrating the data table DT4 at the time of deterioration (W=1.0 Ah). As with the data table DT2 in FIGS. 5A and 5B, data in which the temperature is 40° C. is partially indicated. It should be noted that the resistance increase rate in the initial state shown in FIG. 7A is obtained by adding the resistance increase rates of the positive and negative electrodes at the identical discharge amount in FIG. 5A and FIG. 5B together.

(Step S340)

Next, in a step S340, from the data table DT4 (FIGS. 7A and 7B) generated in the step S330, the upper limit value Rmax' of the resistance increase rate of the battery determined in the step S300, and the lower limit value Rmin' of the resistance increase rate of the battery, the DT1 calculation unit 1382 generates the data table DT1 that indicates Imax(Q, T), Imin(Q, T) based on the relationship among the state-of-charge Q of the battery, the temperature T, the upper limit current Imax, and the lower limit current Imin.

In the case of the secondary battery in the initial state, as described above, on the assumption that an internal resistance is 50 (mΩ), and a target internal resistance after a lapse of ten years is 75 (mΩ), the upper limit value Rmax' of the resistance increase rate is 3.0 (mΩ/year), and the lower limit value Rmin' is 2.0 (mΩ/year). If a reference resistor at the time of calculating the resistance increase rate is 50 (mΩ), 3.0 (mΩ/year) corresponds to 5.5(%/year), and 2.0 (mΩ/year) corresponds to 4.0(%/year).

FIG. 7A illustrates the data table DT4 (T=40° C.) in the initial state. A current value on a straight line indicating the upper limit value Rmax' indicates the upper limit current Imax(Q, T) at the temperature T=40° C. In addition, a current value on a straight line indicating the lower limit value Rmin' indicates the lower limit current Imin(Q, T) at the temperature T=40° C. The above-described 40° C. lines indicated in FIGS. 11A and 11B are obtained by graphing the upper limit current Imax(Q, T) and the lower limit current Imin(Q, T) respectively.

Meanwhile, in the case of a battery, the battery capacitance of which has deteriorated to W0=1.0 (Ah), as described above, it is assumed that after three years use of the secondary battery 136, the internal resistance is 60 (mΩ)). In this case, if a target internal resistance after a lapse of ten years from the initial state is 75 (mΩ), the upper limit value of the resistance increase rate is 2.57 (mΩ/year), and the lower limit value of the resistance increase rate is 1.71 (mΩ/year). If a reference resistor at the time of calculating the resistance increase rate is 50 (mΩ), 2.57 (mΩ/year) corresponds to 5.5(%/year), and 1.71 (mΩ/year) corresponds to approximately 3.4(%/year).

Figure 9A:
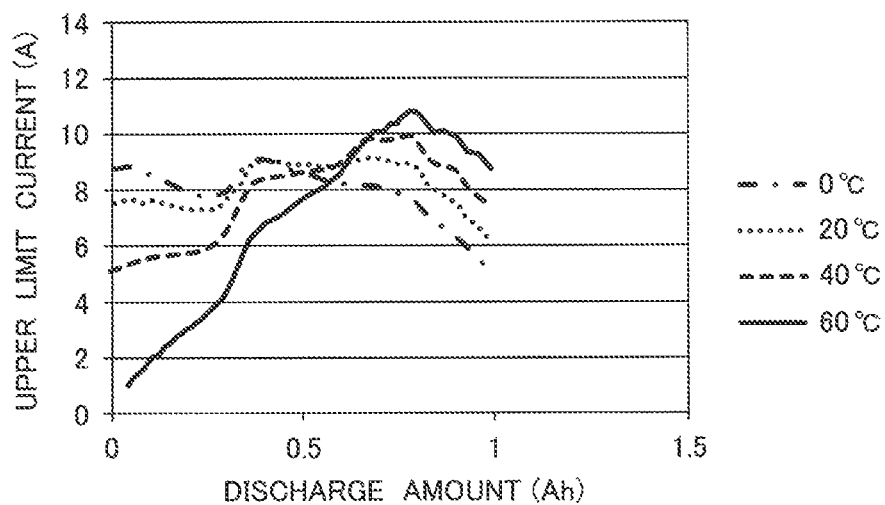
FIGS. 9A and 9B show charts illustrating the data table DT1 at the present point of time (at the time of deterioration).
Figure 9B:
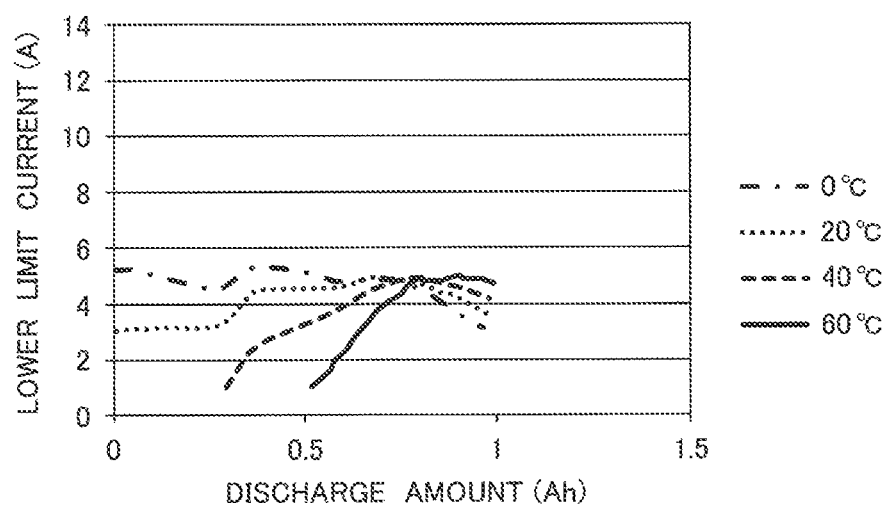

As described above, FIG. 7B illustrates the data table DT4 (the temperature is 40° C.) at the time of deterioration. In this case as well, a current value on a straight line of the upper limit value Rmax'=5.5(%/year) in FIG. 7B indicates the upper limit current Imax(Q, T) at the temperature T=40° C. Similarly, a current value on a straight line of the lower limit value Rmin'=3.4(%/year) indicates the lower limit current Imin(Q, T) at the temperature T=40° C. 40° C. lines indicated in FIGS. 9A and 9B are obtained by graphing the upper limit current Imax(Q, T) and the lower limit current Imin(Q, T) respectively. FIGS. 9A and 9B show charts illustrating the data table DT1 at the present point of time (at the time of deterioration). A line indicating the upper limit current Imax and a line indicating the lower limit current Imin can also be similarly determined at temperatures other than 40° C. shown in FIGS. 9A and 9B.

As described above, the processing shown in FIG. 4 enables to calculate the data table DT1 based on the deterioration state of the secondary battery 136. In addition, the output control of the secondary battery 136 described above is executed by using the calculated data table DT1 at the present point of time. As the result, the output control in which a battery state (deterioration state) of the secondary battery 136 is reflected with high accuracy can be performed.

(Other Methods for Calculating Data Table DT4)

In addition to the above-described data table DT2 (Rp' (Qp, T, I), Rn'(Qn, T, I) shown in FIGS. 5A and 5B), the storage unit 1381 of the battery control device 138 stores beforehand a data table DT10 related to the relationship Rp(Qp, T) among the positive electrode state-of-charge Qp, the temperature T and the resistance Rp, and a data table DT11 related to the relationship Rn(Qn, T) among the negative electrode state-of-charge Qn, the temperature T and the resistance Rn. In addition, the resistance R0 other than the positive electrode and the negative electrode is added as necessary, and subsequently the resistance increase rate R' of the battery is calculated by a proper equation. For example, R'=(Rp×Rp'+Rn×Rn')/(Rp+Rn) and R'=(R0+Rp×Rp'+Rn×Rn')/(R0+Rp+Rn) can be mentioned. Alternatively, with respect to the respective reference values Rp0, Rn0 of the resistances of the positive and negative electrodes, for example, R'=(R0+Rp+Rp0×Rp'+Rn+Rn0×Rn')/(R0+Rp+Rn) can be mentioned. The data table DT4, that is to say, R'(Q, T, I), is calculated in this manner.

(Performance Comparison)

FIG. 10 is a table illustrating a comparison between a case where the current control shown in FIG. 3 is used and a case where the current control is not used. A condition A corresponds to a case where the data table DT1 is not updated, a condition B corresponds to a case where the data table DT1 is updated, and a condition C corresponds to a case where a requested output to the secondary battery is output as it is. Here, the control performed when a secondary battery in which the capacitance is 1.2 (Ah), the internal resistance is 50 (mΩ), and Dp=Dn=0 in an initial state has deteriorated to a state in which the capacitance is 1.0 (Ah), the internal resistance is 60 (mΩ), Dp=0, and Dn=0.2 is indicated. In other words, in the case of the control in the condition A, the data table DT1 shown in FIGS. 11A and 11B is used, and in the case of the control in the condition B, the data table DT1 shown in FIGS. 9A and 9B is used.

As described above, if a target internal resistance after a lapse of seven years is 75 (mΩ), the upper limit value of the resistance increase rate is 2.57 (mΩ/year), and the lower limit value is 1.71 (mΩ/year). In addition, it is assumed that the temperature of the battery is 40° C., the battery voltage is 4.0 (V), and as a state-of-charge, the discharge amount from a fully charged state is 0.25 (Ah). Moreover, the heat capacity of the secondary battery is 15 (J/K), and when the output of the temperature adjustment is twice the Joule heating of the secondary battery, the battery temperature becomes constant. Further, a case where the requested outputs to the secondary battery are 22 (W), 35 (W), 10 (W) will be indicated.

Under the condition A, when the requested output is 22 (W), a requested current is lower than or equal to the upper limit current of the data table DT1 (FIG. 2), and a current that satisfies the requested output is output from the secondary battery. When the requested output is 35 (W), a requested current is higher than or equal to the upper limit current of the data table DT1, and the output of the secondary battery is 31.4 (W) that corresponds to a case where the upper limit current is fed. At this point of time, the control is performed on the condition that when the requested current is higher than the upper limit current, the output of the temperature adjustment is made four times the Joule heating of the battery. As the result, the temperature of the secondary battery after a lapse of ten seconds has decreased to 36.7° C. In addition, when the requested output is 10 (W), a requested current is lower than or equal to the lower limit current of the data table DT1, and therefore a current that satisfies the requested output is output from the secondary battery. At this point of time, when the requested current is lower than the lower limit current, the output of the temperature adjustment is made 0. As the result, the temperature of the battery after a lapse of ten seconds has increased to 40.3° C.".

Under the condition B, when the requested output is 22 (W) or 35 (W), a requested current is higher than or equal to the upper limit current of the data table DT1 (FIGS. 9A and 9B), and therefore the output of the secondary battery is 21.6 (W) that corresponds to a case where the upper limit current is fed. At this point of time, the control is performed on the condition that when the requested current is higher than the upper limit current, the output of the temperature adjustment is made four times the Joule heating of the battery. As the result, the temperature of the secondary battery after a lapse of ten seconds decreases to 38.6° C. In addition, when the requested output is 10 (W), a requested current is higher than or equal to the lower limit current of the data table DT1, and is lower than or equal to the upper limit current of the data table DT1, and therefore the output from the secondary battery is performed as requested.

Under the condition C, the output from the secondary battery is performed as requested, and the temperature is adjusted so as to offset the Joule heating. Therefore, for all outputs, the temperature of the secondary battery is maintained at 40° C.

Comparing the condition A with the condition C, when the requested output is higher than or equal to 35 (W), an increase in resistance is suppressed under the condition C. However, the upper limit 2.57 (mΩ/year) of the target resistance increase rate is exceeded. Meanwhile, under the condition B, for all requested outputs, the upper limit 2.57 (mΩ/year) of the target resistance increase rate is not exceeded.

As described above, as indicated as the condition B, by using the data table DT1 (FIGS. 9A and 9B) updated according to a deterioration state of the secondary battery, the optimum current control based on the deterioration state of the secondary battery can be performed. Moreover, performing the current control such as that shown in FIG. 3 enables to prevent the upper limit of the target resistance increase rate from being exceeded. However, even when the data table DT1 (FIGS. 11A and 11B) of the upper and lower limit currents of the secondary battery in the initial state is used to continue the control of the secondary battery as with the condition A, the deterioration of the secondary battery can be made closer to the target value in comparison with the condition C.

In the above-described embodiment, the following effects can be achieved. (a) The storage unit 1381 of the battery control device 138 stores beforehand the data table DT2 that represents the resistance increase rates of the positive and negative electrodes of the secondary battery 136. In addition, the DT1 calculation unit 1382 calculates the data table DT1 representing correlations among the temperature, the battery state-of-charge and the upper limit current of the secondary battery 136, and correlations among the temperature, the battery state-of-charge and the lower limit current of the secondary battery 136 on the basis of an allowable range (the upper limit value Rmax' and the lower limit value Rmin') of the battery resistance increase rate of the secondary battery 136, the battery state-of-charge Q, the positive electrode state-of-charge Qp, the negative electrode state-of-charge Qn, and the data table DT2. The current control unit 1385 controls a current of the secondary battery 136 on the basis of the data table DT1 calculated by the DT1 calculation unit 1382.

Thus, the data table DT1 based on the deterioration state of the secondary battery 136 is calculated, and a current of the secondary battery 136 is controlled on the basis of the data table DT1. Therefore, the speed of deterioration in characteristics (that is to say, the increase in internal resistance) of the secondary battery can be controlled with high accuracy.

(b) In addition, the battery state-of-charge Q, the positive electrode state-of-charge Qp and the negative electrode state-of-charge Qn may be calculated by the DT3 calculation unit 1383 on the basis of a decrease in capacitance ΔW with respect to the battery capacitance W0 in the initial state.

(c) Moreover, the DT4 calculation unit 1384 is provided, the DT4 calculation unit 1384 calculating the data table DT4 indicating the battery resistance increase rate at the time of the decrease in capacitance of the secondary battery on the basis of the data table DT2 representing the resistance increase rates of the positive and negative electrodes of the secondary battery 136, and on the basis of the battery state-of-charge Q, the positive electrode state-of-charge Qp and the negative electrode state-of-charge Qn calculated by the DT3 calculation unit 1383. The data table DT1 may be calculated on the basis of the allowable range of the battery resistance increase rate and the data table DT4.

(d) Alternatively, the storage unit 1381 further stores the data table DT10 representing correlations among the positive electrode state-of-charge Qp, the temperature T and the resistance Rp of the secondary battery 136, and the data table DT11 representing correlations among the negative electrode state-of-charge Qn, the temperature T and the resistance Rn. The DT4 calculation unit 1384 may calculate the data table DT4 representing the battery resistance increase rate at the time of the decrease in capacitance of the secondary battery 136 on the basis of the resistance R0 other than the positive and negative electrodes, the data table DT2 and data tables DT10, DT11 described above. The data table DT4, that is to say, R'(Q, T, I), may be calculated, for example, as follows: $R'=(R_p \times R_p'+R_n \times R_n')/(R_p+R_n)$ or $R'=(R_0+R_p \times R_p'+R_n \times R_n')/(R_0+R_p+R_n)$.

(e) In addition, in a case where the battery control device 138 is provided in a battery system such as that shown in FIG. 1, that is to say, the battery system 100 provided with: the secondary battery 136; the motor generator 194 as a power generator; the motor generator 192 as an electric motor driven by a current of the secondary battery 136; and the cooling fan 196 that rotates by the motor 195 driven by a current of the secondary battery 136, it is preferable to configure the battery control device 138 as describe below.

In other words, when the current control unit 1385 determines, on the basis of the data table DT1, that the requested current Ireq for the secondary battery 136 is higher than the upper limit current Imax, the current control unit 1385 causes the secondary battery 136 to output the upper limit current Imax, and causes the motor generator 194 to supply the motor generator 192 with a current equivalent to a difference between the requested current Ireq and the upper limit current Imax. In addition, when the current control unit 1385 determines, on the basis of the data table DT1, that the requested current Ireq for the secondary battery 136 is lower than the lower limit current Imin, the current control unit 1385 causes the secondary battery 136 to output the requested current Ireq, and causes a current input into the motor 195 from the secondary battery 136 to decrease.

By performing the current control in such a manner, while the deterioration in characteristics of the secondary battery 136 is prevented from exceeding an assumed range, when the deterioration in characteristics of the secondary battery 136 is lower than the assumed range, the energy efficiency of the battery system as a whole can be enhanced in exchange for the acceleration of the deterioration in characteristics of the secondary battery 136, and consequently the energy efficiency over the whole assumed use period of the battery system can be enhanced.

Various embodiments and modified examples have been explained above. However, the present invention is not limited to the contents thereof. Other modes that can be conceived of within the range of the technical idea of the present invention also fall within the scope of the present invention.

REFERENCE SIGNS LIST

100 battery system
136 secondary battery
138 battery control device
192 motor generator
194 motor generator
195 motor
196 cooling fan
1381 storage unit
1382 DT1 calculation unit
1383 DT3 calculation unit
1384 DT4 calculation unit
1385 current control unit
DT1 to DT4, DT10 to DT11 data table
Imax upper limit current
Imin lower limit current
Ireq requested current
Preq requested output

The invention claimed is:

1. A battery control device comprising:
a processor configured to:
store first data indicating a resistance increase rate of a positive electrode of a secondary battery, and second data indicating a resistance increase rate of a negative electrode of the secondary battery; and
calculate first correlations among an upper limit current of the secondary battery, a battery state-of-charge, and a temperature, and
calculate second correlations among a lower limit current of the secondary battery, the battery state-of-charge, and the temperature, on the basis of an allowable range of a battery resistance increase rate of the secondary battery, the battery state-of-charge, a positive electrode state-of-charge, a negative electrode state-of-charge, the first data and the second data,
wherein a current of the secondary battery is controlled on the basis of the first correlations and the second correlations calculated by the processor.

2. The battery control device according to claim 1, further comprising
the processor configured to calculate the battery state-of-charge, the positive electrode state-of-charge and the negative electrode state-of-charge on the basis of a decrease in capacitance from an initial battery capacitance.

3. The battery control device according to claim 2, further comprising
the processor configured to calculate a battery resistance increase rate at the time of a decrease in capacitance of the secondary battery on the basis of the first data indicating the resistance increase rate of the positive electrode of the secondary battery, and the second data indicating the resistance increase rate of the negative electrode of the secondary battery, and on the basis of the battery state-of-charge, the positive electrode state-of-charge and the negative electrode state-of-charge calculated by the processor,
wherein the processor is configured to calculate the first correlations and the second correlations on the basis of the allowable range, and the battery resistance increase rate at the time of the decrease in capacitance.

4. The battery control device according to claim 2, wherein:
the processor is configured to store third correlations representing correlations among the positive electrode state-of-charge of the secondary battery, the temperature, and a resistance, and fourth correlations representing correlations among the negative electrode state-of-charge of the secondary battery, the temperature, and the resistance;
the processor is configured to calculate a battery resistance increase rate at the time of a decrease in capacitance of the secondary battery on the basis of a resistance other than the resistances of the positive and negative electrodes of the secondary battery, the first data, the second data, the third correlations and the fourth correlations; and
the processor is configured to calculate the first correlations and the second correlations on the basis of the allowable range, and the battery resistance increase rate at the time of the decrease in capacitance.

5. The battery control device set forth in claim 1, the battery control device being provided in a battery system comprising: the secondary battery; a power generator; an electric motor driven by a current of the secondary battery; and a battery cooling device driven by the current of the secondary battery, the battery control device being used to control the current of the secondary battery, the battery control device comprising:
the processor configured to determine, on the basis of the first correlations, whether or not a requested current for the secondary battery is lower than or equal to the upper limit current; and
the processor configured to determine, on the basis of the second correlations, whether or not a requested current for the secondary battery is higher than or equal to the lower limit current, wherein:
when it is determined by the processor that the requested current is higher than the upper limit current, the battery control device causes the secondary battery to output the upper limit current, and causes the power generator to supply the electric motor with a current equivalent to a difference between the requested current and the upper limit current; and
when it is determined by the processor that the requested current is lower than the lower limit current, the battery control device causes the secondary battery to output the requested current, and causes a current input into the battery cooling device from the secondary battery to decrease.

* * * * *